March 10, 1959
H. W. GROVES
2,876,822
ARROW RUNOUT TESTER AND STRAIGHTENER
Filed Sept. 3, 1957
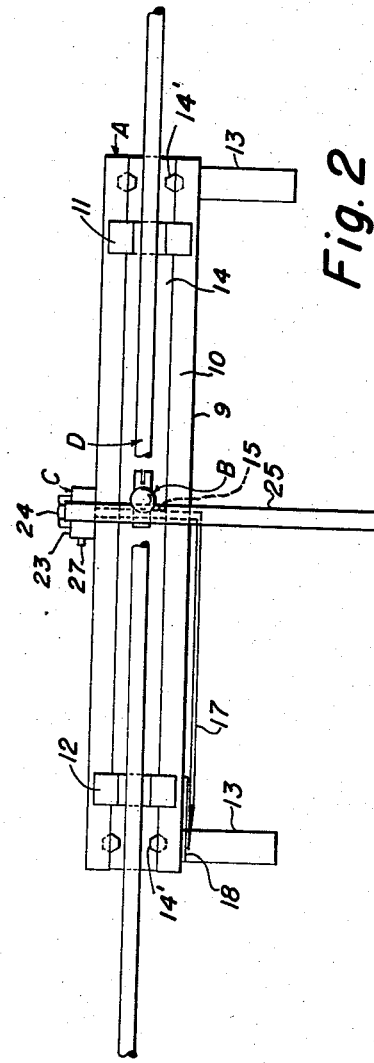
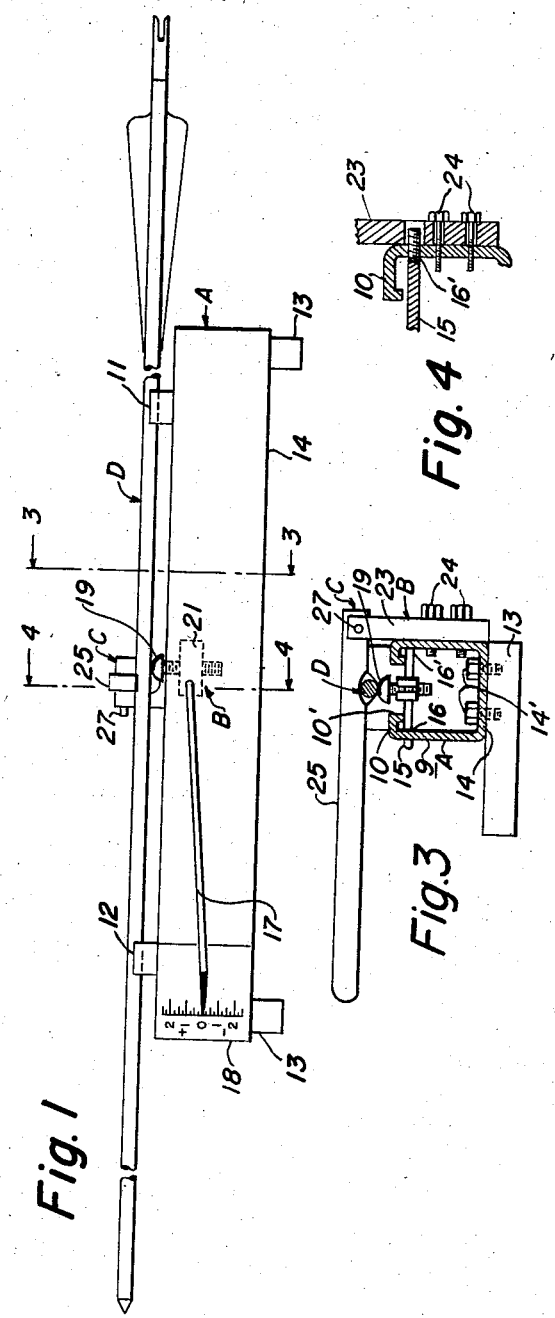
INVENTOR.
Harold W. Groves
BY

2,876,822
ARROW RUNOUT TESTER AND STRAIGHTENER

Harold W. Groves, Los Alamos, N. Mex.

Application September 3, 1957, Serial No. 681,724

3 Claims. (Cl. 153—39)

This invention relates to a device for measuring the straightness of arrow shafts and for removing bends and curves from arrow shafts when such are present.

Arrows for use in archery are generally made of resilient aluminum tubing and, for accurate utilization, must be straight within limits of a few thousandths of an inch. New arrows are sometimes supplied to the archer with greater than acceptable deviations from straightness and, even if straight when delivered, after use are frequently bent or curved as a result of impact with a target. Such arrows are expensive and it is therefore desirable that a simple, reliable, and rugged, portable means be provided for checking their straightness and removing bends or curves.

Accordingly, it is a prime object of the present invention to provide a simple, portable, and highly accurate device for measuring the "runout" of arrow shafts and for restoring the straightness of such arrow shafts which have more than the permissible amount of runout.

It is a further object of this invention to provide an arrow shaft straightness tester with means for straightening bent shafts and for giving accurate measure of correcting over-deflection for obtaining final straightness.

Other objects and advantages of this invention will become apparent from reading the following detailed description taken with the drawing made a part of this specification.

In the drawing:

Figure 1 is a front elevation view of a preferred embodiment; Figure 2 is a top plan view, and Figure 3 is an elevational view on line 3—3 of Figure 1 and Figure 4 is a cross-sectional view of a fragment on plane 4—4 of Figure 1.

Referring to the drawings, my arrow straightness tester and straightener comprises broadly a rigid elongated frame A, a runout indicator assembly B, and a straightener lever assembly C.

The frame assembly A comprises a generally channel-shaped elongated member 9 having a base 14 integral with a pair of side walls and having inturned transverse flanges 10 and re-entrant flanges 10', a pair of slidably supported V-blocks 11 and 12, a pair of laterally extending supporting legs 13 affixed to the channel base 14 as by screws 14', and a scale 18 on one lateral face of the channel support for utilization with the runout indicator, as will later become apparent. The upper surfaces of the channel member inturned transverse flanges 10 and the opposed edges of the re-entrant portions 10' are ground flat and true to provide a pair of parallel ways for cooperation with the V-blocks.

The runout indicator B comprises an indicator shaft 15 which is pivotably supported transversely of the channel member 9 in opposed journals 16, 16' therein provided. The indicator shaft 15 is affixed to or may be integral with the indicator pointer 17. A contact element 19 having a small upper radius of curvature is supported in a flat block 21, which in turn is affixed to the indicator shaft 15 between the flanges 10 of the channel support member. The contact element 19 is spaced a short radius from the indicator shaft, whereby any vertical swinging motion of the contact element results in rotation of the indicator assembly and amplified motion of the indicator pointer 17. In view of the likelihood that shafts of various diameters may be tested and straightened by this device, the contact element is vertically adjustable relative to supporting block 21, by means of mutually cooperating threads, for example. This adjustment is facilitated by providing block 21 with a slot extending from the threaded portion to the edge, thereby providing a squeeze or pinch fit between the block threads and the contact element threads.

The assembly C for restoring trueness to a shaft, in combination with the frame assembly and the indicator assembly, comprises mainly a vertical support 23 affixed as by screws 24 to the outer surface of a side wall of channel member 9 and having a bifurcated upper end portion. The straightening lever 25 rests in the bifurcated portion of support 23 and is pivotably connected thereto by pivot pin 27.

In utilization, an arrow shaft D is supported in the V-blocks and the lever arm 25 is lowered to rest upon the arrow shaft. The weight of the lever arm 25 is coordinated with the unbalanced moment of the indicator assembly so that the lever arm 25 indicates 0 on the indicator card 18 when an arrow shaft is straight. The lever arm, in addition, maintains the arrow shaft firmly in the V-blocks. Rotation of an arrow which is not straight results in a corresponding indication of the runout indicator. When a bend, or deviation from straightness, is indicated, the arrow is rotated and stopped at a maximum negative reading of the indicator. This indication establishes that the bend or curvature in the arrow shaft is maximum in a vertical upward direction. The lever arm 25 is manually pressed downward to an extent which overstresses the arrow shaft and results in a positive deflection of the indicator, and is then released. The position of the indicator is again noted and additional overstressing of the arrow shaft by the lever arm 25 may be in order if the arrow shaft is not sufficiently straight.

It has been found desirable to form the upper surface of the contactor in convex form. This permits the height of the contact element to be adjusted with infinite fineness. It is necessary, however, to prevent appreciable lateral shifting of the contact element and this is accomplished by the threaded journal 16' and the threaded end of the indicator shaft as shown in Figure 4.

Frequently an arrow shaft will acquire a bend or curve over a limited length and, when this is the case, the V-blocks are symmetrically moved inward toward the indicator until they are separated by only the length of the bend. This enables the operator to confine the straightening operation to the bent portion.

The lever arm 25 is not only necessary for the functioning of this device in that, in conjunction with the indicator assembly, the correct amount of overstressing of a bent shaft in the correct direction to achieve straightness is determined in connection with indicator 17, but it also functions to maintain a shaft properly in the V-blocks against the upward pressure of the indicator assembly.

From the foregoing it is seen that I have disclosed a simple, rugged, and completely effective arrow shaft straightness tester and straightener, and that I have shown and described a preferred embodiment thereof. It is understood, however, that other embodiments may be made within the spirit of this invention and, in view thereof, it is understood that this invention should be considered limited only by the appended claims taken in view of the prior art.

What is claimed is:

1. A shaft straightness tester and straightener comprising a pair of parallel elongated ways, a pair of V-blocks slidably supported on said ways, a run-out indicator having a stem portion pivotably supported transversely to and below said ways and a needle indicator portion at right angles to the stem portion and projecting generally in a direction parallel to the ways, a contact element affixed to the stem portion and normally tending to be swung upwardly by the weight of said indicator portion, said contact element being adjusted to lay generally on a line passing through the apices of the V's of the V-blocks, a lever arm pivotably supported adjacent one of said ways for pivotal motion transversely of and above said ways and adapted to rest on a shaft being tested and straightened to maintain the same in the V-blocks and pressing upon said contact member to override the upward pressure of said indicator contact element, said lever arm adapted to apply a controlled deformation to said shaft when the free end thereof is manually manipulated as indicated by said indicator needle portion.

2. A shaft straightness indicator and straightener comprising an elongated channel member having inturned transverse flanges and re-entrant flanges integral with said inturned transverse flanges, said channel member being supported with the channel facing upward and the inturned transverse flanges being flat and parallel thereby providing a pair of ways, said re-entrant flanges having flat vertical parallel surfaces, a pair of V-blocks having the lower flanges fitting within said channel re-entrant portions with a push fit, and having oppositely directed shoulder portions resting on said ways, and the V cut-out portions thereof being aligned with each other, an indicator member having a stem member and a needle portion, said stem portion being pivotably supported transversely of the channel in opposed journals in the channel side walls, an indicator contact element affixed offset to the stem portion for pivoting with a small radius about the stem portion journals, said indicator needle being affixed at right angles to one end of the stem portion, and providing a greater moment of rotation than that of the contact element, an indicator card bearing run-out mensuration affixed to the exterior surface of one channel flange for cooperation with the needle free end, a lever arm pivotably supported adjacent one of said ways for swinging movement transversely and above the channel ways with an intermediate portion thereof adapted to contact and maintain a shaft properly in the V-blocks, and having a free end for manual manipulation in controlled cooperation with the indicator to remove errors from straightness in shafts being tested.

3. The device of claim 2 in which the lever arm has a relieved arcuate portion to contact a shaft to be tested without locally deforming or denting the same.

References Cited in the file of this patent
UNITED STATES PATENTS

| | | |
|---|---|---|
| 65,856 | Adams | June 18, 1867 |
| 87,571 | Ladd | Mar. 9, 1869 |
| 117,860 | Bushnell | Aug. 8, 1871 |
| 1,308,501 | Littell | July 1, 1919 |
| 2,371,464 | Olsson | Mar. 13, 1945 |
| 2,407,040 | Taramaschi | Sept. 3, 1946 |